United States Patent
Chen et al.

(10) Patent No.: US 10,841,213 B2
(45) Date of Patent: Nov. 17, 2020

(54) APPARATUS AND METHOD FOR COMMUNICATION BETWEEN CHAINS IN A DECENTRALIZED SYSTEM

(71) Applicant: MOAC BLOCKCHAIN TECH INC, Palo Alto, CA (US)

(72) Inventors: Xiaohu Chen, Mountain View, CA (US); Xinle Yang, Portland, OR (US); Zhengpeng Li, Columbia, MD (US); Qing Xu, Palo Alto, CA (US); Yuechao Ma, Seattle, WA (US); Xiannong Fu, Irvine, CA (US); Yang Chen, Bellevue, WA (US)

(73) Assignee: MOAC BLOCKCHAIN TECH INC, Palo Alto, CA (US)

( * ) Notice: Subject to any disclaimer, the term of this patent is extended or adjusted under 35 U.S.C. 154(b) by 221 days.

(21) Appl. No.: 16/160,605

(22) Filed: Oct. 15, 2018

(65) Prior Publication Data
US 2020/0120019 A1 Apr. 16, 2020

(51) Int. Cl.
*H04L 12/721* (2013.01)
*H04L 9/32* (2006.01)
*H04L 9/08* (2006.01)

(52) U.S. Cl.
CPC ............ *H04L 45/44* (2013.01); *H04L 9/0861* (2013.01); *H04L 9/3247* (2013.01)

(58) Field of Classification Search
CPC ..... H04L 45/44; H04L 9/3247; H04L 9/0861; H04L 2209/38; H04L 9/3239
See application file for complete search history.

(56) References Cited

U.S. PATENT DOCUMENTS

| | | | |
|---|---|---|---|
| 2018/0025435 A1* | 1/2018 | Karame | G06Q 20/02 705/30 |
| 2018/0285839 A1* | 10/2018 | Yang | G06Q 20/0655 |
| 2018/0349621 A1* | 12/2018 | Schvey | G09C 1/00 |
| 2019/0018887 A1* | 1/2019 | Madisetti | H04L 9/3236 |
| 2019/0236298 A1* | 8/2019 | Agarwal | H04L 9/3239 |
| 2019/0279206 A1* | 9/2019 | Song | G06F 21/64 |
| 2019/0289068 A1* | 9/2019 | Ma | H04L 67/327 |
| 2019/0327080 A1* | 10/2019 | Liu | H04L 9/3247 |
| 2019/0332702 A1* | 10/2019 | Manamohan | G06F 16/2379 |

(Continued)

OTHER PUBLICATIONS

Li et al., "H Consensus for Multiagent-Based Supply Chain Systems Under Switching Topology and Uncertain Demands", 2018, IEEE, pp. 1-14. (Year: 2018).*

*Primary Examiner* — Matthew Smithers

(57) ABSTRACT

A packet including a message intended for a smart contract associated with the second subchain and a node identifier is constructed at each of a plurality of nodes associated with the first subchain. The message constructed by the plurality of nodes are identical and may be a transaction request requesting the smart contract to execute on a blockchain. Each of the packets is sent to one or more nodes associated with the second subchain. The packets and messages received by one or more of a plurality of nodes associated with the second subchain are monitored and processed at the second subchain to determine if a consensus on request has been reached from the first subchain. If a consensus on request has been reached from the first subchain, the smart contract associated with the second subchain executes on the blockchain in accordance with the transaction request.

13 Claims, 6 Drawing Sheets

(56) References Cited

U.S. PATENT DOCUMENTS

2020/0034334 A1\* 1/2020 Lu .......................... H04L 9/0637
2020/0118068 A1\* 4/2020 Turetsky ............... H04L 9/3239
2020/0125391 A1\* 4/2020 Lee ...................... G06Q 20/027

\* cited by examiner

APPARATUS AND METHOD FOR COMMUNICATION BETWEEN CHAINS IN A DECENTRALIZED SYSTEM

TECHNICAL FIELD

The present disclosure relates generally to communication over large-scale networks, and more particularly, to apparatuses and methods that provide for communication between subchains in a decentralized system.

BACKGROUND

A blockchain system may be implemented in peer-to-peer network having a large number of distributed nodes forming a large-scale decentralized network. The number of nodes in a large-scale decentralized network may be, for example, around 10,000. In a decentralized blockchain system, the ability to efficiently process tasks, such as transactions or smart contract calls, is critical. To improve the efficiently and capacity of blockchain, the distributed nodes within the large-scale decentralized network may be divided into multiple groups, each group forming a separate blockchain that handles one task at a time. Each of these separate blockchains is usually called a subchain.

Typically, each separate blockchain processes a certain application. In the case of complex application involving multiple tasks, it is desirable to be able to divide the tasks among multiple blockchains. Doing so requires the blockchains to communicate with each other to coordinate execution of the various tasks. Communication between blockchains may be implemented using a centralized approach or a decentralized approach.

In a centralized approach, a node in a first blockchain sends a transaction request message to an address of a node in a second blockchain. A node of the second blockchain executes the requests and sends an execution reply message back to the first blockchain. A drawback of the centralized approach is that for each transmitted request or reply message, the address of the node from which that message originated is a single point of failure. Accordingly, if that address is compromised, the entire blockchain structure may be compromised.

In a decentralized scenario, transaction request messages and execution reply messages are originated by a smart contract with a consensus protocol that is associated with each respective blockchain. Execution within each blockchain is done by a consensus result, independent of any single node within either blockchain. A smart contract can be identified by an address. However, because the smart contract only resides inside one blockchain, its identity cannot be verified by another blockchain. Thus, direct communication between smart contracts in different blockchains is not possible.

It is therefore desirable to have decentralized communication between blockchains, wherein the identities of respective smart contracts are verifiable by respective blockchains and direct communication between smart contracts is possible. The concepts disclosed below address this need and others.

SUMMARY

A mechanism for facilitating communication between a first subchain and a second subchain in a decentralized network includes a construction mechanism and a sending mechanism. The construction mechanism includes construction logic that initiates the construction of a packet at each of a plurality of nodes associated with the first subchain. The packet includes a message intended for a smart contract associated with the second subchain and a node identifier. The messages constructed by each of the plurality of nodes are identical, and may correspond to one of a transaction request or a transaction reply or other information. The node identifier may correspond to a signature signed by the private key of the node. The sending mechanism including sending logic that causes each node that has constructed a packet, to transmit its packet to one or more nodes associated with the second subchain.

In an aspect, the mechanism further includes a cross-chain mechanism that includes cross-chain logic that monitors packets received by one or more of the plurality of nodes associated with the first subchain to determine if a consensus on request has been reached from another subchain. The cross-chain mechanism includes nodelist logic that accesses a nodelist that includes node identifiers for a plurality of nodes associated with the other subchain. The other subchain may be the same subchain as the second subchain or it may be a different subchain. The cross-chain logic is configured to determine that a consensus on request is reached when an identical message has been received from a threshold measure of nodes identified in the nodelist. For example, in one embodiment, if an identical message is received from 51% of the nodes identified in the nodelist then a consensus on request is determined to have been reached. If a consensus on request is reached, a processing mechanism processes the identical message (also referred to herein as a consensus message). For example, if the consensus message is a transaction request, the processing mechanism executes the transaction. If the cross-chain logic determines that a consensus on request has not been reached, then the messages received from the other subchain are ignored.

A smart contract embodied in at least one of a plurality of nodes associated with a first subchain includes logic that causes each of the plurality of nodes associated with the first subchain to construct a packet including a message intended for a smart contract associated with a second subchain and a node identifier. The messages constructed by each of the plurality of nodes are identical, and may correspond to one of a transaction request or a transaction reply or other information. The node identifier may correspond to a signature signed by the private key of the node. The smart contract causes each of the plurality of nodes to transmit its packet to one or more nodes associated with the second subchain.

In an aspect, the smart contract also includes cross-chain logic that monitors packets received by one or more of the plurality of nodes associated with the first subchain to determine if a consensus on request has been reached from another subchain. The other subchain may be the same subchain as the second subchain or it may be a different subchain. The cross-chain logic of the smart contract includes nodelist logic that obtains a nodelist that includes node identifiers for a plurality of nodes associated with the other subchain, and a consensus on request is determined to have been reached when an identical message has been received from a threshold measure of nodes included in the nodelist. For example, in one embodiment, if an identical message is received from 51% of the nodes identified in the nodelist then a consensus on request is determined to have been reached. If a consensus on request is reached, the smart contract processes the identical message (also referred to herein as a consensus message).

An apparatus for facilitating communication between a first subchain and a second subchain in a decentralized network includes a network interface, a memory having smart contract logic, and a processor coupled to the network interface and the memory. The processor is configured to execute the smart contract logic to cause each of a plurality of nodes associated with the first subchain to construct a packet including a message intended for a smart contract associated with the second subchain and a node identifier. The messages constructed by each of the plurality of nodes are identical, and may correspond to one of a transaction request or a transaction reply or other information. The node identifier may correspond to a signature signed by the private key of the node. The processor is also configured to execute the smart contract logic to thereby cause each of the plurality of nodes to transmit its packet to one or more nodes associated with the second subchain.

In an aspect of the apparatus, the processor is further configured to execute the smart contract logic to monitor packets received by one or more of the plurality of nodes associated with the first subchain to determine if a consensus on request has been reached from another subchain. The other subchain may be the same subchain as the second subchain or it may be a different subchain. Nodelist logic of the smart contract obtains a nodelist that includes node identifiers for a plurality of nodes associated with the other subchain, and a consensus on request is determined to have been reached when an identical message has been received from a threshold measure of nodes included in the nodelist. For example, in one embodiment, if an identical message is received from 51% of the nodes identified in the nodelist then a consensus on request is determined to have been reached. If a consensus on request is reached, the processor executes the smart contract logic that processes the identical message (also referred to herein as a consensus message).

A method of communication between a first subchain and a second subchain in a decentralized network includes constructing a packet at each of a plurality of nodes associated with the first subchain. The packet includes a message intended for a smart contract associated with the second subchain and a node identifier. The messages constructed by each of the plurality of nodes are identical, and may correspond to one of a transaction request or a transaction reply or other information. The node identifier may correspond to a signature signed by the private key of the node. The method also includes sending each packet to one or more nodes associated with the second subchain. The method further includes, at the second subchain, monitoring the packets received by one or more of a plurality of nodes associated with the second subchain to determine if a consensus on request has been reached from the first subchain. The method further includes processing the identical message at the second subchain if a consensus on request has been reached from the first subchain.

Additional aspects of the method include constructing a packet at each of a plurality of nodes associated with the second subchain, and sending each packet to one or more nodes associated with the first subchain. The packet includes a message intended for a smart contract associated with the first subchain and a node identifier. The messages constructed by each of the plurality of nodes are identical, and may correspond to one of a transaction request or a transaction reply or other information. The method further includes, at the first subchain, monitoring the packets received by one or more of a plurality of nodes associated with the first subchain to determine if a consensus on request has been reached from the second subchain; and, if a consensus on request has been reached from the second subchain, processing the identical message at the first subchain.

It is understood that other aspects of mechanisms, nodes, and methods will become readily apparent to those skilled in the art from the following detailed description, wherein various aspects are shown and described by way of illustration.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
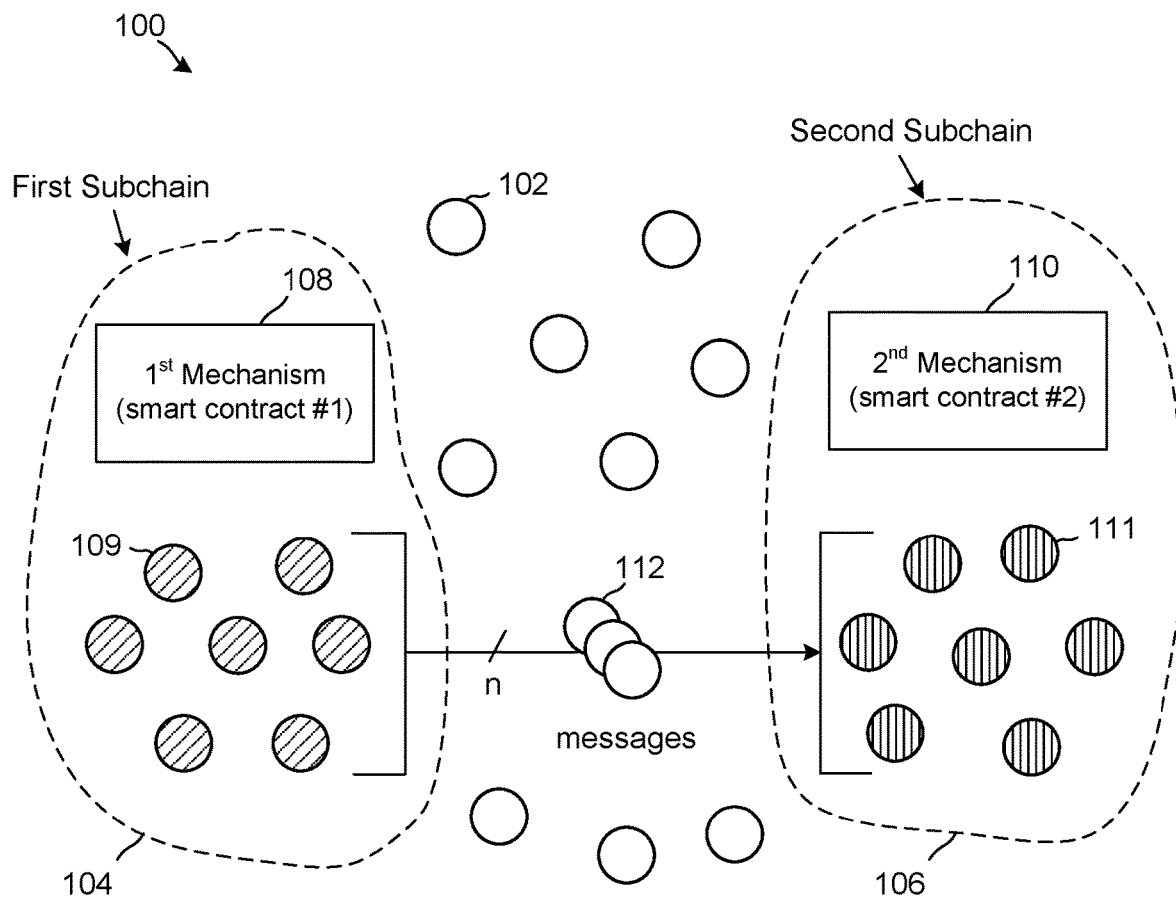
FIG. 1 is an illustration of a large-scale decentralized network, including a first group of nodes forming a first subchain operating in accordance with a first mechanism and a second group of nodes forming a second subchain operating in accordance with a second mechanism.

FIG. 1 is an illustration of a peer-to-peer network 100 having a large number of distributed nodes 102 forming a large-scale decentralized network or system. The number of nodes 102 in the large-scale decentralized network 100 may be, for example, around 10,000. Nodes 102 within the large-scale decentralized network 100 are grouped into a first subchain 104 and a second subchain 106. These groups of nodes 104, 106 may be described as upper layers of the large-scale decentralized network 100. Nodes outside of these groupings 104, 106 represent the lower layer of the large-scale decentralized network 100. While a large number of nodes 102 and subchains 104, 106 may be present in a large-scale decentralized network, for ease of illustration, a reduced number of nodes and subchains are shown in FIG. 1.

The first subchain 104 represents a logical grouping of nodes 109 within the large-scale decentralized network 100. The node grouping may be based on the needs of an application being run on the nodes 109 in the first subchain 104. For example, in FIG. 1, a first mechanism 108 for executing blockchain transactions is deployed among a group of nodes 109 in the first subchain 104. The first mechanism 108 may be a smart contract deployed in the public blockchain system like Bitcoin and Ethereum, and the nodes 109 in the first subchain 104 may be coordinated to perform certain blockchain tasks through, for example, a consensus mechanism or protocol. The consensus protocol typically takes a round-robin or randomized approach, where each node 109 associated with the subchain 104 has equal weight to determine which node will generate the new, next block in the blockchain for the subchain. The nodes 109 associated with the subchain 104 could change over the time, with some nodes leaving the subchain and new ones joining.

In addition to executing blockchain transactions, the first mechanism 108 may include other mechanisms that implement a communication protocol between the first subchain 104 and the second subchain 106 that allows the nodes 109 of the first subchain to submit a message to the second subchain. The message may be, for example, a transaction request, a transaction reply, or a conveyer of information. To this end, and with reference to FIG. 2, the first mechanism 108 may include a processing mechanism 202, a construction mechanism 204, a sending mechanism 206, and a cross-chain mechanism 208 with a nodelist mechanism 210.

The processing mechanism 202 includes processing logic that executes blockchain transactions. The construction mechanism 204 includes construction logic that initiates construction of data packets by nodes 109 in the first subchain 104. Each of these packets include a message intended for a remote smart contract associated with another subchain, such as the second subchain 106, and an identifier of the node 109 that constructed the packet. The message may be a transaction request intended for processing by the remote smart contract or it may be a transaction reply indicating that a transaction request from the remote smart contract was executed. The sending mechanism 206 includes sending logic that causes each node 109 in the first subchain 104 that has constructed a packet to transmit the packet to the other subchain, e.g., the second subchain 106.

The cross-chain mechanism 208 includes cross-chain logic that monitors packets received by the nodes 109 of the first subchain 104 to determine if a consensus on request has been reached. The nodelist mechanism 210 includes nodelist logic that maintains a current list of nodes 111 associated with other subchains, such as the second subchain 106, within the large-scale decentralized network 100. The list of nodes may be obtained from public information, such as the public wallet address of the other subchains, and updated as needed when the composition of the other subchain changes. As described further below, the cross-chain mechanism 208 uses the nodelist to determine if a consensus on request has been reached by the first subchain 104. If a consensus corresponding to a transaction request has been reached, the first mechanism 108 executes the transaction in accordance with the processing logic of the processing mechanism 202.

Like the first subchain 104, the second subchain 106 represents a logical grouping of nodes 111 within the large-scale decentralized network 100. The node grouping may be based on the needs of an application being run on the nodes 111 in the second subchain 106. For example, in FIG. 1, a second mechanism 110 for executing blockchain transactions is deployed among a group of nodes 111 in the second subchain 106. The second mechanism 110 may be a smart contract deployed in the public blockchain system like Bitcoin and Ethereum, and the nodes 111 in the second subchain 106 may be coordinated to perform certain blockchain tasks through, for example, a consensus mechanism or protocol. The consensus protocol typically takes a round-robin approach, where each node 111 associated with the subchain 106 has equal weight to determine which node will generate the new, next block in the blockchain for the subchain. The nodes 111 associated with the subchain 106 could change over the time, with some nodes leaving the subchain and new ones joining.

In addition to executing blockchain transactions, the second mechanism 110 may include other mechanisms that implement a communication protocol between the second subchain 106 and the first subchain 104 that allows the nodes 111 of the second subchain to submit a message to the first subchain. The message may be, for example, a transaction request, a reply, or a conveyer of information. To this end, and with reference to FIG. 2, the second mechanism 110 may include a processing mechanism 212, a construction mechanism 214, a send mechanism 216, and a cross-chain mechanism 218 with a nodelist mechanism 220.

The processing mechanism 212 includes processing logic that executes blockchain transactions. The construction mechanism 214 includes construction logic that initiates construction of data packets by nodes 111 in the second subchain 106. Each of these packets includes a message intended for a remote smart contract associated with another subchain, such as the first subchain 104, and an identifier of the node 111 that constructed the packet. The message may be a transaction request intended for processing by the remote smart contract or it may be a transaction reply indicating that a transaction request from the remote smart contract was executed. The send mechanism 216 includes sending logic that causes each node 111 in the second subchain 106 that has constructed a packet to transmit the packet to the other subchain, e.g., the first subchain 104.

The cross-chain mechanism 218 includes cross-chain logic that monitors packets received by the nodes 111 of the second subchain 106 to determine if a consensus on request has been reached. The nodelist mechanism 220 includes nodelist logic that maintains a current list of nodes 109 associated with other subchains, such as the first subchain 104, within the large-scale decentralized network 100. The list of nodes may be obtained from public information, such as the public wallet address of the other subchains, and updated as needed when the composition of the other subchain changes. As described further below, the cross-chain mechanism 218 uses the nodelist to determine if a consensus on request has been reached by the second subchain. If a consensus corresponding to a transaction request has been reached, the second mechanism 110 executes the transaction in accordance with the processing logic of the processing mechanism 212.

Returning to FIG. 1, in one configuration, the lower layer of the large-scale decentralized network 100 includes nodes 102 that relay packets with messages from the nodes 109 in the first subchain 104 to one or more nodes 111 in the second subchain 106. For example, each node 109 in the first subchain 104 may relay a packet to the second subchain 106 by sending its packet to a node 112 in the lower layer. The lower-layer node 112, in turn, forwards the packet to a node 111 associated with the second subchain 106. Each node 109 in the first subchain 104 may send its packet to a unique one of the lower-layer nodes 112. Alternatively, a group of nodes 109 in the first subchain 104 may send their packets to the same lower-layer node 112. In another configuration, packets from nodes 109 in the first subchain 104 may be sent directly to nodes 111 associated with the second subchain 106.

The nodes 109 within the first subchain 104 (operating in conjunction with the first mechanism 108), together with the nodes 111 within the second subchain 106 (operating in conjunction with the second mechanism 110), enable communication between the subchains 104, 106 in a way that provides numerous benefits. These benefits include: 1) increased confidence in legitimate communications and transaction processing between the subchains based on the exchange of consensus requests, 2) prompt execution of communications and transaction processing between the subchains based on the exchange of consensus requests, and 3) elimination of the need to manually request communication by a single user with private key signature.

Having thus described the high level operation of nodes and mechanisms for facilitating efficient and confident communication between a first subchain 104 and a second subchain 106 in a decentralized network 100, a more details description follows.

Figure 3:
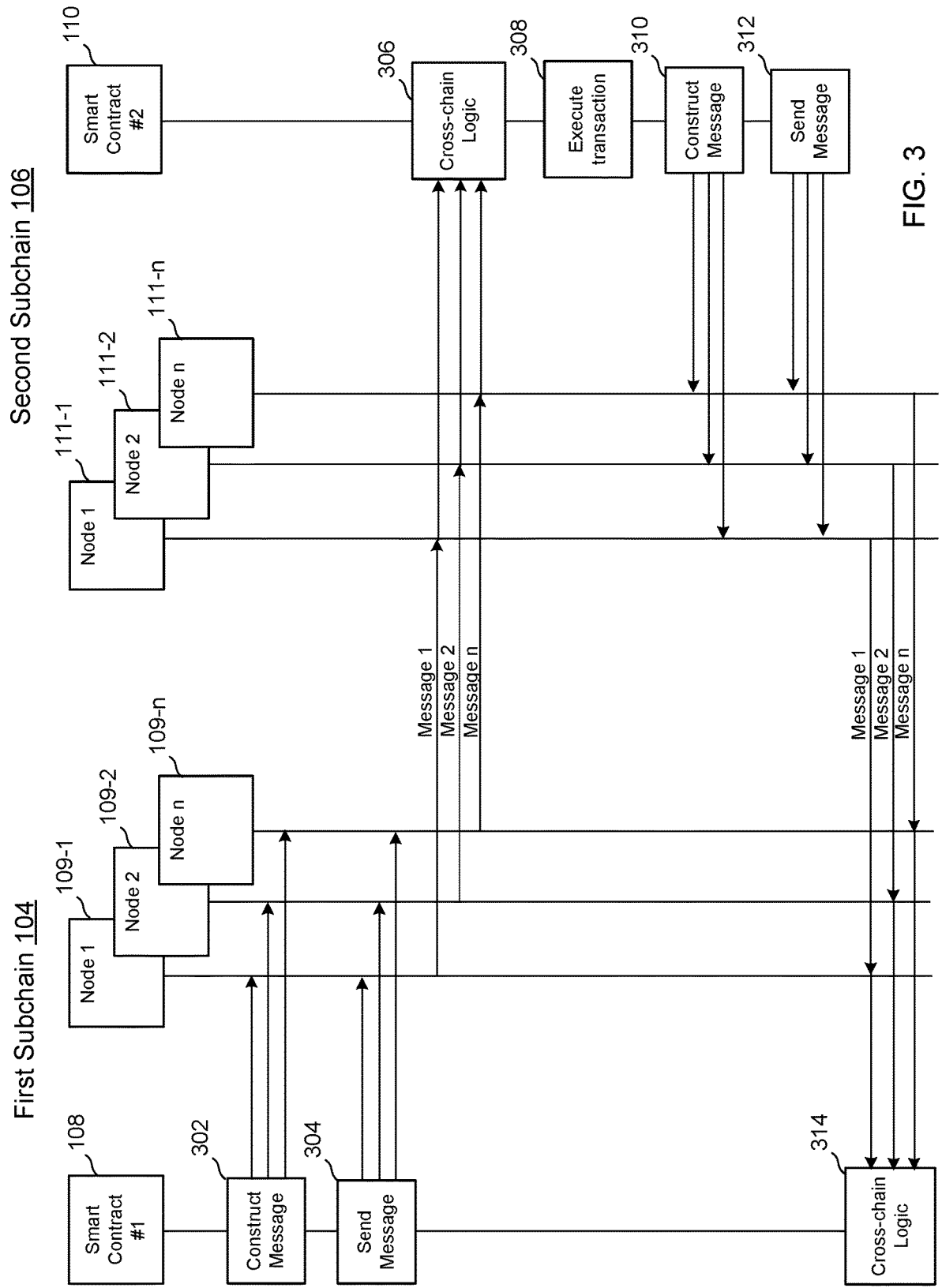
FIG. 3 is a flow diagram of communication between the first subchain and the second subchain of FIG. 1.

FIG. 3 is a flow diagram of communication between a first subchain 104 and a second subchain 106 in a decentralized network 100. The flow diagram of FIG. 3 begins at a stage where a first mechanism 108 associated with the first subchain 104 desires to send a messages, e.g., a transaction request, to a second mechanism 110 associated with a second subchain 106. The mechanisms 108, 110 may be smart contracts, and in one configuration are configured to execute the same smart contract logic.

At operation 302, a first smart contract 108 associated with the first subchain 104 executes local construct logic that initiate the construction of a data packet at each node 109-1 thru 109-$n$ that is associated with the first subchain 104. The packet includes a message, e.g., a transaction request, requesting execution of a blockchain transaction by a second smart contract 110 associated with the second subchain 106. In addition to the transaction request itself, the packet includes an target address that corresponds to the address of the second smart contract 110, or more specifically the address of a node 111-1 thru 111-$n$ associated with the second subchain 106, and an identifier of the node that is constructing the packet. The node identifier may be a signature corresponding to the private key of the node 109-1 thru 109-$n$.

At operation 304, the first smart contract 108 associated with the first subchain 104 executes sending logic that causes each node 109-1 thru 109-$n$ that has constructed a packet, to transmit its packet to one or more nodes 111-1 thru 111-$n$ associated with the second subchain 106. As previously described, the packets may be relayed through underlying lower-layer nodes 102 (not shown in FIG. 3) or over a common blockchain (not shown), or they may be sent directly to the nodes 111-1 thru 111-$n$ associated with the second subchain 106.

At operation 306, a second smart contract 110 associated with the second subchain 106 executes cross-chain logic with respect to the messages received by the one or more nodes 111-1 thru 111-$n$ associated with the second subchain 106. To this end, the second smart contract 110 processes the received packets to determine if a consensus on request has been reached from the first subchain. To this end, the second smart contract 110 accesses a nodelist that identifies the nodes 109-1 thru 109-$n$ that are currently associated with the first subchain 104, and determines that a consensus on request is reached when an identical message is received from a threshold number of nodes included in the nodelist.

For example, the second smart contract 110 executing cross-chain logic may: 1) identify messages that were received from a node 109-1 thru 109-$n$ included in the nodelist as first-subchain messages, 2) count the number of first-subchain messages that are identical, and 3) determine if the count satisfies a threshold criterion. If the threshold criterion is satisfied, the second smart contract 110 concludes that a consensus on request has been reached. The threshold criterion may correspond to a percentage of nodes 109-1 thru 109-$n$ in the first subchain 104. For example, a criterion may be set at 51%, in which case the second smart contract 110 concludes a consensus on request has been reached when an identical message is received from 51% or more of the nodes 109-1 thru 109-$n$ in the nodelist.

At operation 308, if a consensus on request has been reached at the second subchain 106, the second smart contract 110 processes the identical message, i.e., the consensus message, that was received. For example, if the consensus message corresponds to a transaction request, the second smart contract 110 executes the consensus request in accordance with processing logic associated with the smart contract.

At operation 310, the second smart contract 110 may begin to repeat the process in the other direction. For example, the second smart contract 110 may execute local construct logic that initiates the construction of a data packet at each node 111-1 thru 111-$n$ that is associated with the second subchain 106. The packet may include a messages corresponding to a transaction request requesting execution of a blockchain transaction by a first smart contract 108 associated with the first subchain 104 or it may include a reply to the first subchain 104 informing that its transaction request was executed. In addition to the message, the packet includes a target address that corresponds to the address of the first smart contract 108, or more specifically the address of a node 109-1 thru 109-$n$ associated with the first subchain 104, and an identifier of the node that constructed the packet. The node identifier may be a signature corresponding to the private key of the node 111-1 thru 111-$n$.

At operation 312, the second smart contract 110 associated with the second subchain 106 executes sending logic that causes each node 111-1 thru 111-$n$ that has constructed a packet, to transmit its packet to one or more nodes 109-1 thru 109-$n$ associated with the first subchain 104. As previously described, the packets may be relayed through underlying lower-layer nodes 102 (not shown in FIG. 3) or over a common blockchain (not shown), or they may be sent directly to the nodes 109-1 thru 109-$n$ associated with the first subchain 104.

At operation 314, a first smart contract 108 associated with the first subchain 104 executes cross-chain logic with respect to the message received by the one or more nodes 109-1 thru 109-$n$ associated with the first subchain 104. To this end, the first smart contract 108 processes the received packets to determine if a consensus on request has been reached from the second subchain. To this end, the first smart contract 108 accesses a nodelist that identifies the nodes 111-1 thru 111-$n$ that are currently associated with the second subchain 106, and determines that a consensus on request is reached when an identical message is received from a threshold number of nodes included in the nodelist.

For example, the first smart contract 108 executing cross-chain logic may: 1) identify messages that were received from a node 111-1 thru 111-$n$ included in the nodelist as second-subchain messages, 2) count the number of second-subchain messages that are identical, and 3) determine if the count satisfies a threshold criterion. If the threshold criterion is satisfied, the first smart contract 108 concludes that a consensus on request has been reached. The threshold criterion may correspond to a percentage of nodes 111-1 thru 111-$n$ in the second subchain 106. For example, a criterion may be set at 51%, in which case the first smart contract 108 concludes a consensus on request has been reached when an identical request is received from 51% or more of the nodes 111-1 thru 111-$n$ in the nodelist.

If a consensus on request has been reached at the first subchain 104, the first smart contract 108 processes the identical message, i.e., the consensus message. For example, if the consensus message corresponds to a transaction request, the first smart contract 108 executes the consensus request in accordance with processing logic associated with the smart contract. If the consensus message corresponds to a transaction reply, the first smart contract 108 may process the reply and thereby be informed that a transaction request from the first subchain 104 to the second subchain 106 was successfully executed or not successfully executed, whichever the case may be.

Figure 4:
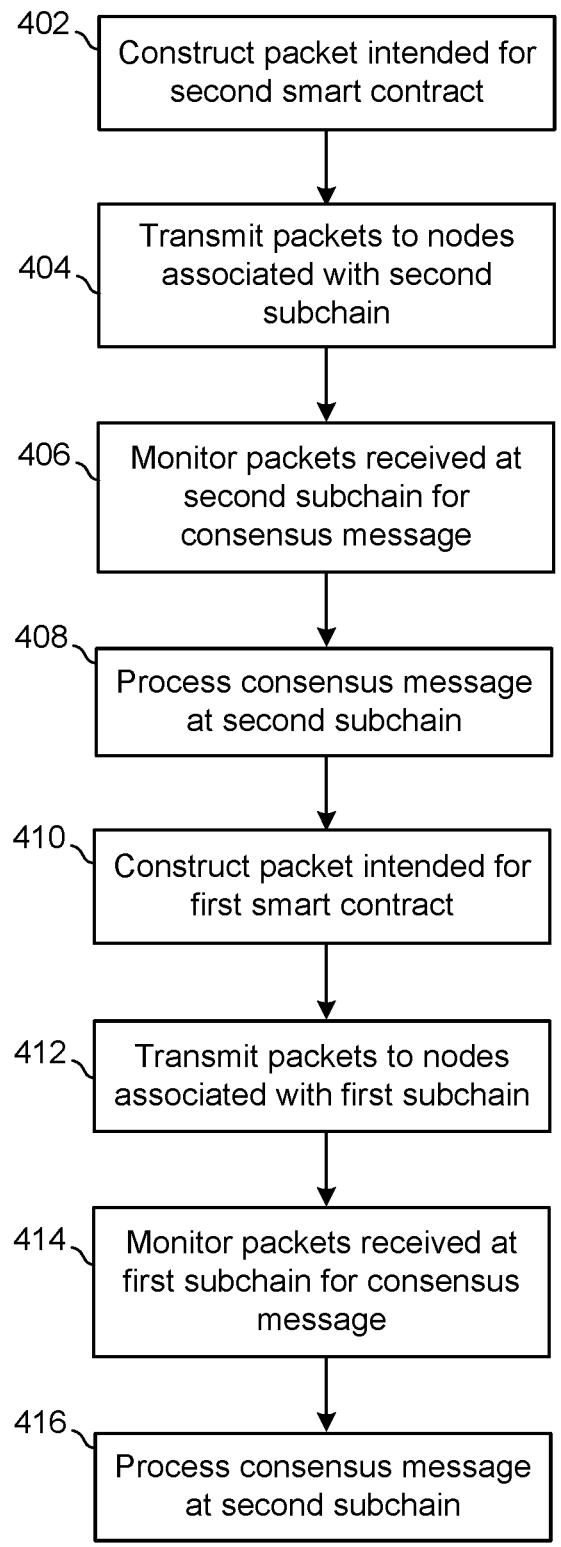
FIG. 4 is a flowchart of a method of communication between the first subchain and the second subchain of FIG. 1.

FIG. 4 is a flowchart of an example method of communication between a first subchain 104 and a second subchain 106 in a decentralized network 100. The method may be performed, for example, by the nodes 109 within the first subchain 104 (operating in conjunction with a first smart contract 108), together with the nodes 111 within the second subchain 106 (operating in conjunction with a second smart contract 110). In the example communication in the flowchart of FIG. 4, the direction of communication is from the first subchain 104 to the second subchain 106, and then back from the second subchain to the first subchain.

At block 402, the nodes 109 associated with the first subchain 104 operate in conjunction with the first smart contract 108 to construct, at each of a plurality of nodes associated with the first subchain, a packet including a message, e.g., a transaction request, intended for the second smart contract 110 associated with the second subchain 106.

At block 404, each of the nodes 109 associated with the first subchain 104 operates in conjunction with the first smart contract 108 to transmit its packet to one or more nodes 111 associated with the second subchain 106.

At block 406, one or more nodes 111 associated with the second subchain operate in accordance with the second smart contract 110 to monitor the packets and messages, e.g., transaction requests, included in the packets received by the nodes to determine if a consensus on request has been reached from the first subchain 104. To this end, the second smart contract 110 accesses a nodelist that identifies the nodes 109-1 thru 109-$n$ that are currently associated with the first subchain 104, and determine that a consensus on request is reached when an identical message, i.e., identical transaction request, is received from a threshold number of nodes included in the nodelist.

More specifically, the second smart contract 110 executing cross-chain logic may: 1) identify requests that were received from a node 109-1 thru 109-$n$ included in the nodelist as first-subchain requests, 2) count the number of first-subchain requests that are identical, and 3) determine if the count satisfies a threshold criterion. If the threshold criterion is satisfied, the second smart contract 110 concludes that a consensus on request has been reached. The threshold criterion may correspond to a percentage of nodes 109-1 thru 109-$n$ in the first subchain 104. For example, a criterion may be set at 51%, in which case the second smart contract 110 concludes a consensus on request has been reached when an identical request is received from 51% or more of the nodes 109-1 thru 109-$n$ in the nodelist.

At block 408, if a consensus on request is reached, the second smart contract 110 processes the identical message, i.e., the consensus message. For example, if the consensus message is a transaction request, the second smart contract 110 executes the transaction in accordance with transaction logic.

At block 410, the nodes 111 associated with the second subchain 106 operate in conjunction with the second smart contract 110 to construct, at each of a plurality of nodes associated with the second subchain, a packet including a message, e.g., a transaction request, intended for the first smart contract 108 associated with the first subchain 104. The message may be, for example, a confirmation that the consensus transaction request sent by the first subchain 104 was processed.

At block 412, each of the nodes 111 associated with the second subchain 106 operates in conjunction with the second smart contract 110 to transmit its packet to one or more nodes 109 associated with the first subchain 104.

At block 414, one or more nodes 109 associated with the first subchain 104 operate in accordance with the first smart contract 108 to monitor the packets and messages included in the packets received by the nodes to determine if a consensus on request has been reached from the second subchain 106. To this end, the first smart contract 108 accesses a nodelist that identifies the nodes 111-1 thru 111-$n$ that are currently associated with the second subchain 106, and determine that a consensus on request is reached when an identical transaction request or identical message is received from a threshold number of nodes included in the nodelist.

More specifically, the first smart contract 108 executing cross-chain logic may: 1) identify requests/messages that were received from a node 111-1 thru 111-$n$ included in the nodelist as second-subchain requests/messages, 2) count the number of second-subchain requests/messages that are identical, and 3) determine if the count satisfies a threshold criterion. If the threshold criterion is satisfied, the first smart contract 108 concludes that a consensus on request has been reached. The threshold criterion may correspond to a percentage of nodes 111-1 thru 111-$n$ in the second subchain 106. For example, a criterion may be set at 51%, in which case the first smart contract 108 concludes a consensus on request has been reached when an identical request or identical message is received from 51% or more of the nodes 111-1 thru 111-$n$ in the nodelist At block 416, if a consensus on request is reached, the second smart contract 110 processes the identical message, i.e., the consensus message. For example, if the consensus message is a transaction request, the second smart contract 110 executes the transaction in accordance with transaction logic. Or, if the consensus message is a confirmation of the processing of a prior transaction request, the second smart contract 110 processes the confirmation accordingly.

Returning to block 406, if the second smart contract 110 determines that a consensus on request has not been reached, or the threshold criterion is not met within desired period of time, the second smart contract may proceed directly to blocks 410 and 412 to construct and send a message to the first subchain indicating that a consensus on request was not reached by the second subchain 106. Likewise, at block 414, if the first smart contract 108 determines that a consensus on request has not been reached, or the threshold criterion is not met within desired period of time, the first smart contract may proceed directly to blocks 402 and 404 to construct and send a message to the second subchain indicating that a threshold criterion was not met by the first subchain 104.

Figure 5:
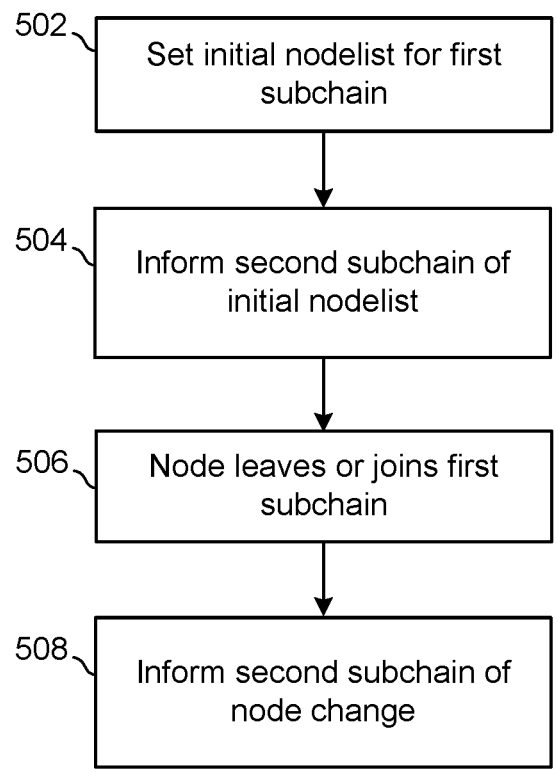
FIG. 5 is a flowchart of a method of maintaining current lists of nodes associated with the first subchain and the second subchain of FIG. 1.

Regarding the nodelists relied upon by the smart contracts in blocks 406 and 414, FIG. 5 is a flowchart of a method of maintaining current nodelists among the subchains 104, 106 so the first subchain knows the identities, e.g., public addresses, of the nodes associated with the second subchain and vis versa. As previously described, the makeup of the nodes 109, 111 that are associated with a subchain may change—with current nodes leaving the subchain and new nodes joining the subchain. Accordingly, to accurately determine the existence of a consensus message, the nodelists referenced during the monitoring of received messages should be up to date. To this end, at block 502, the nodelist for the first subchain 104 is initially determined based on the set of nodes forming the first subchain. For example, the creator or owner of the first subchain 104 may determine the initial set nodes in the subchain and create an initial nodelist. At block 504, the first subchain 104 informs the second subchain 106 of the initial nodelist. At block 506, a node leaves or joins the first subchain 104, thereby changing the node set forming the first subchain. At block 508, the first subchain 104 informs the second subchain 106 of the change.

In blocks 504 and 508, the first subchain 104 may inform the second subchain 106 of the nodelist or nodelist change in accordance with the cross-chain logic described above. For example, the nodes 109 associated with the first subchain 104 may construct and send packets that includes messages corresponding to the initial nodelist, a node list change, or an updated nodelist to the second subchain 106. The second subchain 106 may process the packets to determine if a consensus on request has been reached, and process the consensus message to obtain the initial nodelist, the node list change, or updated nodelist.

Figure 6:
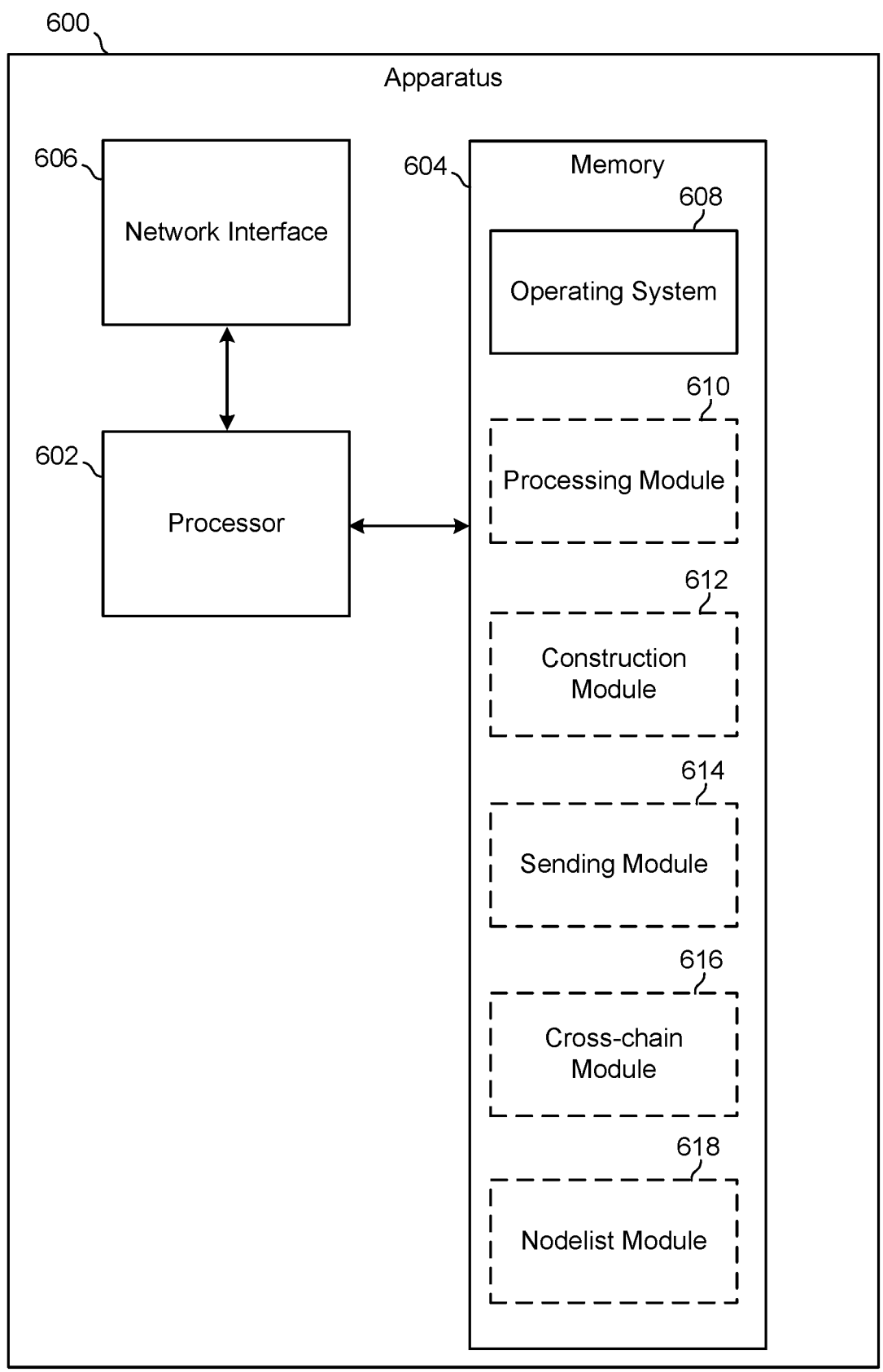
FIG. 6 is a block diagram of an apparatus configured to implement the methods of FIGS. 3, 4 and 5.

FIG. 6 is a schematic block diagram of an apparatus 600. The apparatus 600 may correspond to one or more nodes configured to enable the method of communication between a first subchain 104 and a second subchain 106 in a decentralized network 100, as described above with reference to FIGS. 3, 4 and 5. The apparatus may be, for example, a node 109 within the first subchain 104 or a node 111 within the second subchain 106.

The apparatus 600 may include one or more processors 602 configured to access and execute computer-executable instructions stored in at least one memory 604. The processor 602 may be implemented as appropriate in hardware, software, firmware, or combinations thereof. Software or firmware implementations of the processor 602 may include computer-executable or machine-executable instructions written in any suitable programming language to perform the various functions described herein. The processor 602 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The apparatus 600 may also include a chipset (not shown) for controlling communications between the processor 602 and one or more of the other components of the apparatus 600. The processor 602 may also include one or more application-specific integrated circuits (ASICs) or application-specific standard products (ASSPs) for handling specific data processing functions or tasks.

The memory 604 may include, but is not limited to, random access memory (RAM), flash RAM, magnetic media storage, optical media storage, and so forth. The memory 604 may include volatile memory configured to store information when supplied with power and/or non-volatile memory configured to store information even when not supplied with power. The memory 604 may store various program modules, application programs, and so forth that may include computer-executable instructions that upon execution by the processor 602 may cause various operations to be performed. The memory 604 may further store a variety of data manipulated and/or generated during execution of computer-executable instructions by the processor 602.

The apparatus 600 may further include one or more network interfaces 606 that may facilitate communication between the apparatus 600 and one or more other nodes using any suitable communications standard. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The memory 604 may store various program modules, application programs, and so forth that may include computer-executable instructions that upon execution by the processor 602 may cause various operations to be performed. For example, the memory 604 may include an operating system module (O/S) 608 that may be configured to manage hardware resources such as the network interface 606 and provide various services to applications executing on the apparatus 600.

Figure 2:
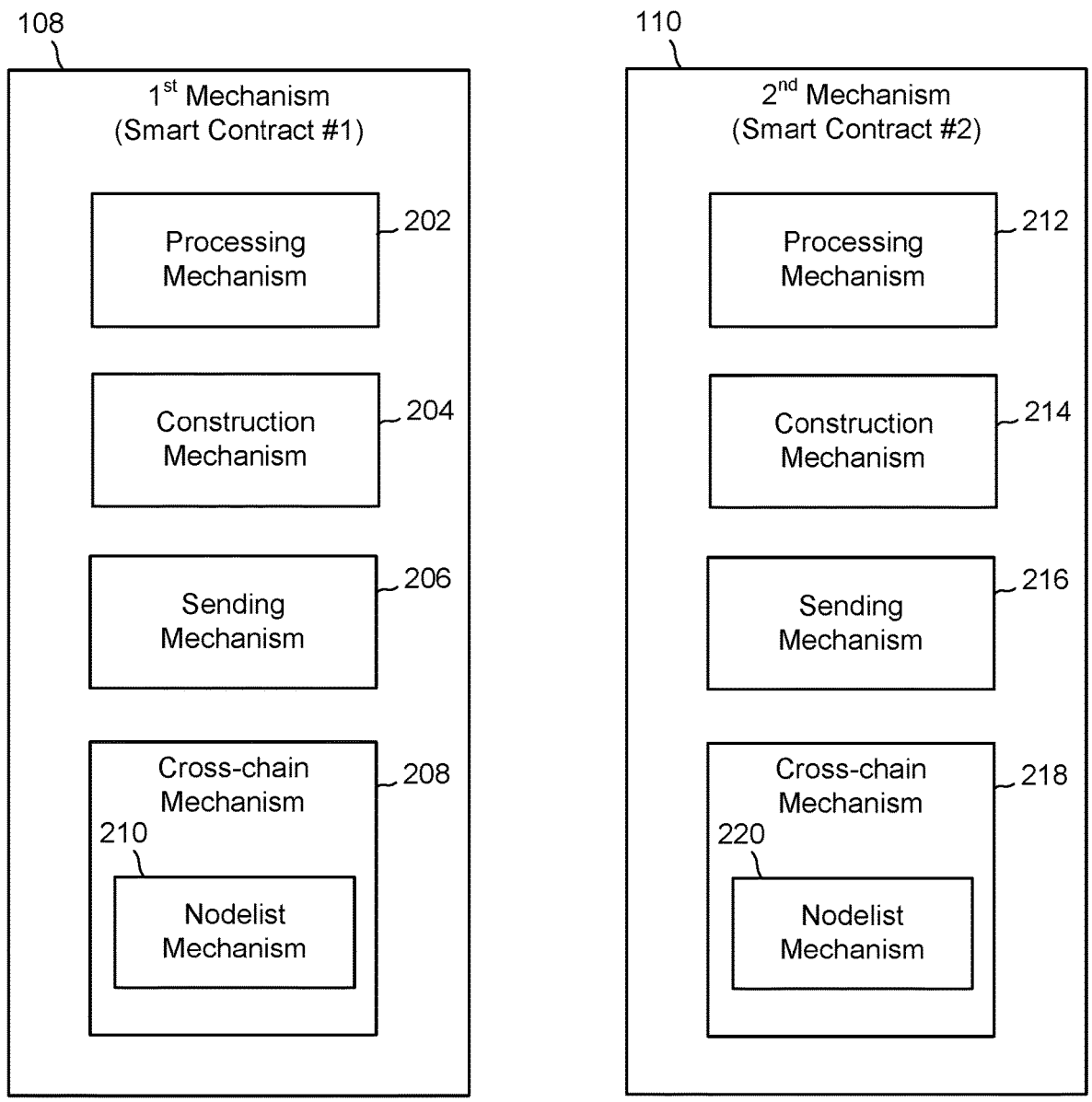
FIG. 2 is a block diagram of the first mechanism and the second mechanism of FIG. 1.

The memory 604 stores additional program modules such as a processing module 610, a construction module 612, a sending module 614, a cross-chain module 616 and a nodelist module 618, each of which includes functions in the form of logic and rules that support and enable the method of communication between a first subchain 104 and a second subchain 106 in a decentralized network 100, as described above with reference to FIGS. 3, 4 and 5. Although illustrated as separate modules in FIG. 6, one or more of the modules may be a part of or a submodule of another module. For example, as shown in FIG. 2, the nodelist module 618 may be a submodule of the cross-chain module 616. Each of the transaction module 610, the construction module 612, the sending module 614, the cross-chain module 616 and the nodelist module 618 includes computer-executable instructions that when executed by the processor 602 cause various operations to be performed, such as the operations described above with respect to FIGS. 3, 4 and 5.

The apparatus 600 and modules 610, 612, 614, 616, 618 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for facilitating communication between a first subchain and a second subchain in a decentralized network, the method comprising:
   constructing, by one or more processors, at each of a plurality of nodes associated with the first subchain, of a packet including a message intended for a second smart contract associated with the second subchain and a node identifier, where the messages constructed by the plurality of nodes are identical, wherein the packet comprises a target address corresponds to an address of a first smart contract associated with the first subchain;
   transmitting, by the one or more processors, each packet to one or more nodes associated with the second subchain;
   monitoring, by the one or more processors, the packets received by one or more of the plurality of nodes associated with the first subchain to determine if a consensus on request has been reached from another subchain, which other subchain may correspond to the second subchain or a third subchain different from the second subchain; and
   processing, by the one or more processors, the message if a consensus on request has been reached from the other subchain.

2. The method of claim 1, wherein the message corresponds to one of a transaction request or a transaction reply.

3. The method of claim 1, wherein the node identifier corresponds to a signature signed by the private key of the node.

4. The method of claim 1, accessing, by the one or more processors, a nodelist that includes node identifiers for a plurality of nodes associated with the other subchain, and wherein a consensus on request is determined to have been reached when an identical message has been received from a threshold measure of nodes identified in the nodelist.

5. The method of claim 4, wherein the threshold measure corresponds to a percentage of the total number of nodes identified in the nodelist.

6. The method of claim 5, further comprising receiving, by the one or more processors, information relating to the nodes associated with the other subchain and to update the nodelist accordingly.

7. An apparatus for facilitating communication between a first subchain and a second subchain in a decentralized network, the apparatus comprising:
   a network interface;
   a memory having a smart contract logic; and
   a processor coupled to the network interface and the memory and configured to execute the smart contract logic to:
      cause each of a plurality of nodes associated with the first subchain to construct a packet including a message intended for a second smart contract associated with the second subchain and a node identifier, where the messages constructed by the plurality of nodes are identical, wherein the packet comprises a target address corresponds to an address of a first smart contract associated with the first subchain; and
      cause each of the plurality of nodes to transmit its packet to one or more nodes associated with the second subchain, wherein the processor is further configured to execute the smart contract logic to monitor packets received by one or more of the plurality of nodes associated with the first subchain to determine if a consensus on request has been reached from a another subchain, which other subchain may correspond to the second subchain or a third subchain different from the second subchain.

8. The apparatus of claim 7, wherein the processor is further configured to execute the smart contract logic to obtain a nodelist that includes node identifiers for a plurality of nodes associated with the other subchain, and wherein a consensus on request is determined to have been reached when an identical message has been received from a threshold measure of nodes identified in the nodelist.

9. The apparatus of claim 8, wherein the smart contract logic that obtains the nodelist is configured to receive information relating to the nodes associated with the other subchain and to update the nodelist accordingly.

10. A method of communication between a first subchain and a second subchain in a decentralized network, the method comprising:
    constructing at each of a plurality of nodes associated with the first subchain, a packet including a message intended for a second smart contract associated with the second subchain and a node identifier, where the messages constructed by the plurality of nodes are an identical message, wherein the packet comprises a target address corresponds to an address of a first smart contract associated with the first subchain;
    sending each packet to one or more nodes associated with the second subchain;
    at the second subchain, monitoring the packets received by one or more of a plurality of nodes associated with the second subchain to determine if a consensus on request has been reached from the first subchain; and
    constructing at each of a plurality of nodes associated with the second subchain, a packet including a message intended for the first smart contract associated with the first subchain and a node identifier where the messages constructed by the plurality of nodes are an identical message.

11. The method of claim 10, further comprising, if a consensus on request has been reached from the first subchain, processing the identical message at the second subchain.

12. The method of claim 10, further comprising:
    sending each packet to one or more nodes associated with the first subchain; and
    at the first subchain, monitoring the packets received by one or more of a plurality of nodes associated with the first subchain to determine if a consensus on request has been reached from the second subchain.

13. The method of claim 12, further comprising, if a consensus on request has been reached from the second subchain, processing the identical message at the first subchain.

* * * * *